No. 707,932. Patented Aug. 26, 1902.
G. KNOCHENHAUER.
FORCING FRAME OR LIKE SASH OR WINDOW.
(Application filed Apr. 11, 1902.)
(No Model.) 2 Sheets—Sheet 1.
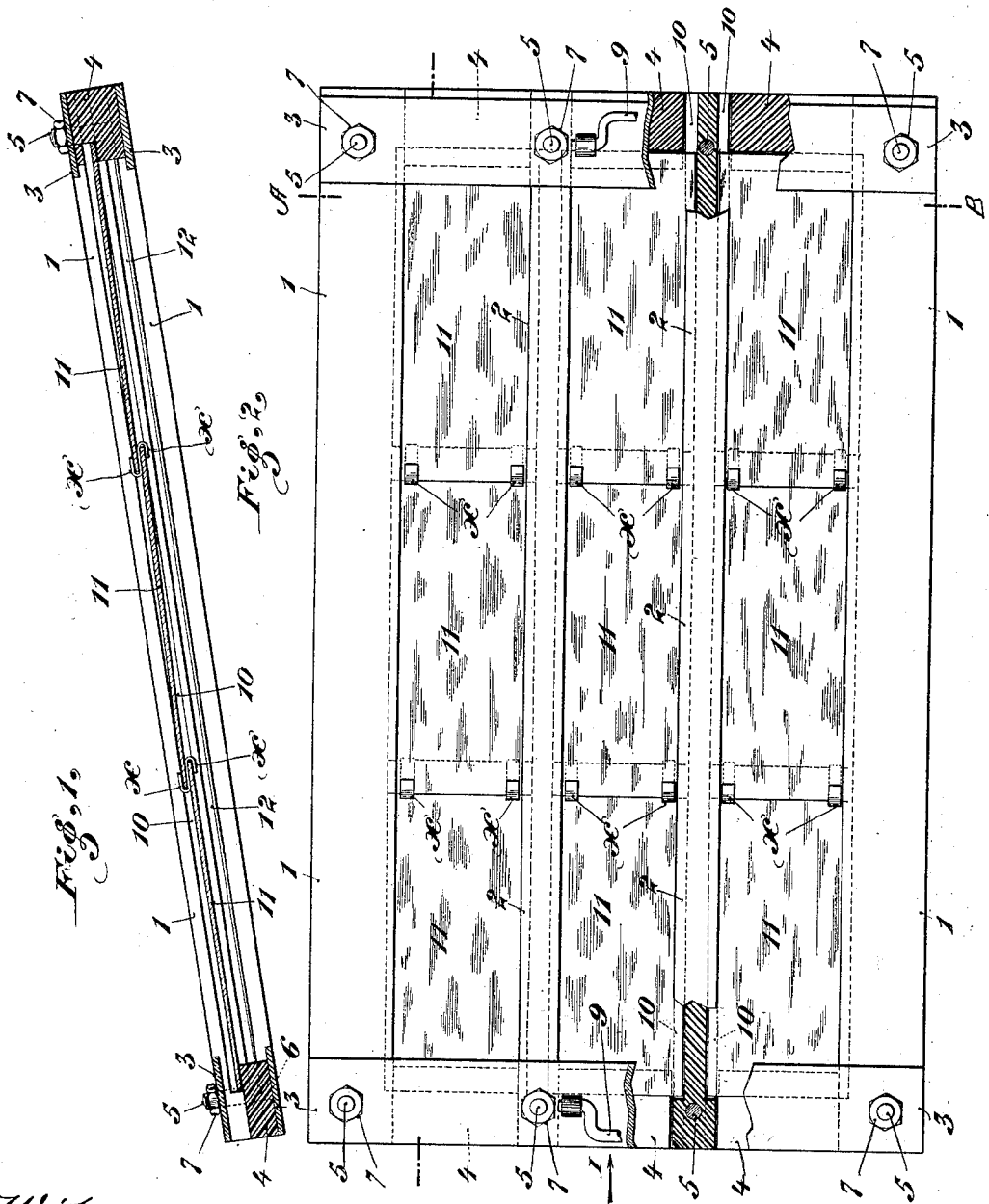

No. 707,932. Patented Aug. 26, 1902.
G. KNOCHENHAUER.
FORCING FRAME OR LIKE SASH OR WINDOW.
(Application filed Apr. 11, 1902.)
(No Model.) 2 Sheets—Sheet 2.
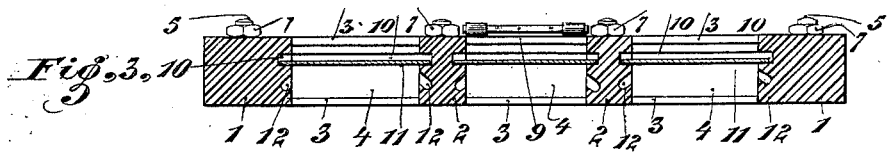
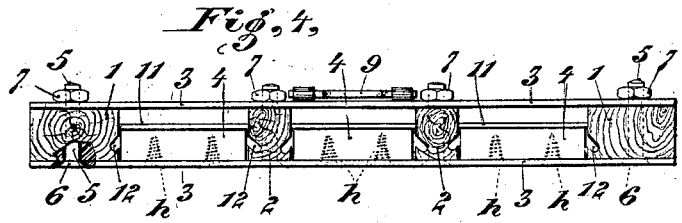
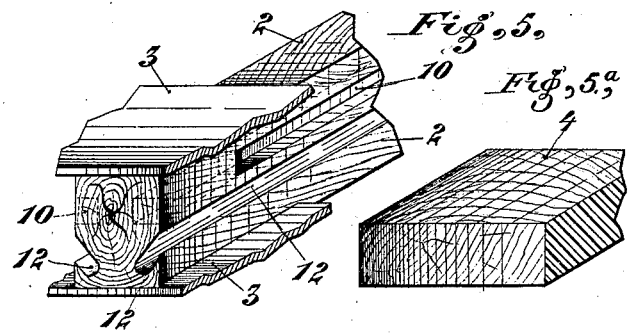
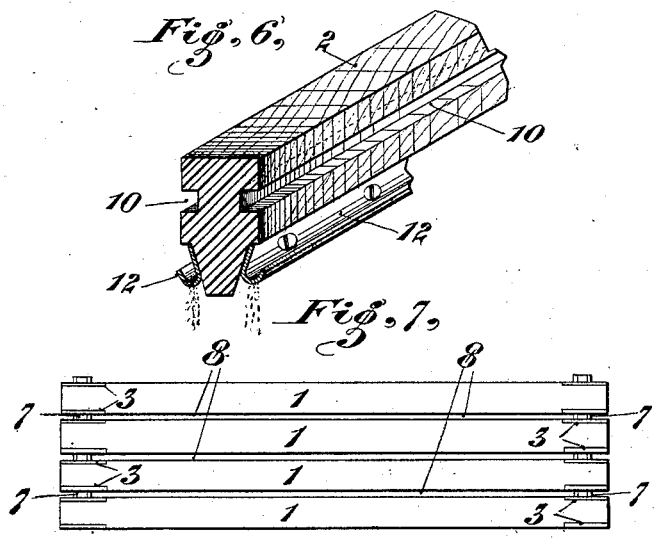
Witnesses:
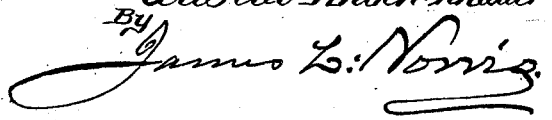
Inventor
Gustav Knochenhauer
By James L. Norris
Atty.

UNITED STATES PATENT OFFICE.

GUSTAV KNOCHENHAUER, OF SCHAALA, NEAR RUDOLSTADT, GERMANY.

FORCING-FRAME OR LIKE SASH OR WINDOW.

SPECIFICATION forming part of Letters Patent No. 707,932, dated August 26, 1902.

Application filed April 11, 1902. Serial No. 102,476. (No model.)

*To all whom it may concern:*

Be it known that I, GUSTAV KNOCHENHAUER, gardener, a subject of the Prince of Schwarzburg-Rudolstadt, residing at Schaala, near Rudolstadt i. Th., in the Principality of Schwarzburg - Rudolstadt, German Empire, have invented certain new and useful Improvements in or Relating to Forcing-Frames or Like Sashes or Windows, of which the following is a specification.

My invention relates to improvements in or relating to forcing-frames and like sashes or windows. It is a well-known drawback connected with the use of forcing and early-bedding frames that the parts near or close to the ground are liable, owing to the moisture of the ground, to become rotten and brittle, and it very often happens that such frames if not repaired in time give way and fall to pieces, whereby the glass is broken and destroyed and the frame rendered useless. In most cases such frames have to be entirely renewed, this being an expensive matter in large gardens, while the young plants suffer if no other frames are to hand into which to transfer them. These drawbacks are not overcome by making the frames of iron, for it has been found that the latter in consequence of the unavoidable moisture soon gets rusty, and rust is very injurious to the plants. Therefore wooden frames have again been brought into use.

The object of the present invention is to enable the gardener or attendant to exchange at any time any of the parts of the frame when necessary without allowing the access of rain or snow, such as occurs when the glass plates are puttied in.

In the accompanying drawings, Figure 1 is a longitudinal section of a practical form of construction of a forcing-frame with exchangeable or removable parts. Fig. 2 shows a top plan view, in partial section, of the same. Fig. 3 is a cross-section on the line A B of Fig. 2. Fig. 4 is a front view viewed in direction of the arrow shown in Fig. 2. Fig. 5 is a perspective view of the lower front portion of a window-bar with water-channels formed in the bar. Fig. 5$^a$ is a perspective view of one of the closure-blocks, partly broken away. Fig. 6 is a similar view showing a water-channel of sheet-zinc secured to the bar, and Fig. 7 shows a series of frames arranged in superposition.

The wooden longitudinal side bars 1 of the frame, as well as its wooden intermediate bars 2, are placed with their upper and under end surfaces between flat iron bars 3, coated with zinc, which, together with the wooden closure-blocks 4, detachably secured by screws $h$ (shown in dotted lines in Fig. 4) to the bars 3, form the cross parts of the frame. The flat iron bars 3, the parts 1, and the bars 2 are in easily-detachable connection by bolts 5. The heads 6 of the bolts 5 are sunk into the lower bars 3, while the nuts 7 rest on the top of the upper bars 3 and on building up a framing according to Fig. 7 form spaces 8 for circulation of the air, which continually flows through, thus drying the frames when out of use. The upper bars 3 are provided conveniently at their centers with handles 9, which can be hinged for easy handling. The frame parts 1 and intermediate bars 2 are provided with longitudinal grooves 10, into which are inserted the glass plates 11, with overlapping edges, which are secured together in position by S hooks or strips $x$, which, if necessary to prevent them slipping sidewise, can be pressed into the longitudinal groove 10. While the upper blocks 4 between the bars 3 and parts 1 and 2 fill up the spaces between the parts 1 2 3 and are also provided with longitudinal grooves 10 to receive the glass plates 11, the lower blocks 4 fill up the spaces between the parts 1 2 3 only to the extent of half the distance between the bars 3, so that through the space thus created rain-water and snow can easily run off. As the glass plates 11 are arranged in the grooves 10 loosely and without being cemented therein, it might happen that water could flow through and drop onto the plants below. In order to prevent this and any injurious action on the plants, water channels or grooves 12 are arranged immediately below the grooves 10 in the bars 1 and 2 of the frame, according to the present invention, which water-channels are either cut into the wood or made of galvanized sheet metal and screwed onto the bars.

A certain number of duplicate parts of the frame should always be in stock. If one of the parts becomes rotten or injured, the bolts 5 are unscrewed and the injured or deteriorated part is removed and substituted by a fresh one. This part is then secured by the same bolts, which are coated with zinc or made of non-rusting material, so as to last for a very long time.

Having now particularly described and ascertained the nature of the said invention and in what manner the same is to be performed, I declare what I claim is—

1. A forcing or like sash or window with readily-removable parts comprising wooden longitudinal side bars wooden longitudinal intermediate bars connected together at their upper and lower ends by easily-removable metal bars and screw-bolts the bars being provided with longitudinal grooves adapted to receive the glass plates and with water-discharge passages immediately beneath the grooves the spaces between the longitudinal bars being filled up by wooden blocks forming together with the metal cross-bars the cross-bars of the frame substantially as described.

2. A forcing or like sash consisting of longitudinally-extending side bars, longitudinally-extending intermediate bars, said bars provided with grooves adapted to receive glass plates and further provided with water-discharge passages, cross-bars connecting said longitudinally-extending bars together, and closure-blocks supported by the cross-bars and arranged between the longitudinally-extending bars.

In testimony whereof I have hereunto set my hand in presence of two subscribing witnesses.

GUSTAV KNOCHENHAUER.

Witnesses:
 IDA BRENIKE,
 MAX MEYER.